US012657440B2

(12) United States Patent
Bae

(10) Patent No.: US 12,657,440 B2
(45) Date of Patent: Jun. 16, 2026

(54) SPIKING NEURAL NETWORK AND NEURON CLOCK GENERATING METHOD THEREOF

(71) Applicant: ELECTRONICS AND TELECOMMUNICATIONS RESEARCH INSTITUTE, Daejeon (KR)

(72) Inventor: Younghwan Bae, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 1143 days.

(21) Appl. No.: 17/684,103

(22) Filed: Mar. 1, 2022

(65) Prior Publication Data

US 2022/0309327 A1 Sep. 29, 2022

(30) Foreign Application Priority Data

Mar. 29, 2021 (KR) ........................ 10-2021-0040307

(51) Int. Cl.
*G06N 3/04* (2023.01)
*G06N 3/049* (2023.01)
*G06N 3/063* (2023.01)
(52) U.S. Cl.
CPC ............. *G06N 3/049* (2013.01); *G06N 3/063* (2013.01)
(58) Field of Classification Search
None
See application file for complete search history.

(56) References Cited

U.S. PATENT DOCUMENTS

| | | | | |
|---|---|---|---|---|
| 1,468,299 A * | 9/1923 | Howard | ................ | B65D 5/106 |
| | | | | 229/131.1 |
| 8,601,423 B1 * | 12/2013 | Philip | ................ | G06F 15/7825 |
| | | | | 716/121 |
| 10,885,424 B2 * | 1/2021 | Modha | ...................... | G06N 3/04 |
| 2014/0003178 A1 * | 1/2014 | Song | ................ | G11C 11/40611 |
| | | | | 365/222 |
| 2015/0003281 A1 * | 1/2015 | Hasenplaugh | .......... | H04L 49/15 |
| | | | | 370/254 |

(Continued)

FOREIGN PATENT DOCUMENTS

| | | |
|---|---|---|
| KR | 20180085422 A | 7/2018 |
| KR | 20200132444 A | 11/2020 |

(Continued)

*Primary Examiner* — Maikhanh Nguyen

(57) ABSTRACT

Disclosed is a spiking neural network which transfers a spike packet between neuron cores. The spiking neural network includes two-dimensional mesh routers that respectively correspond to the plurality of neuron cores and each of which outputs an idle signal based on a state of an input buffer or an output buffer in which the spike packet is stored, a gate circuit that generates a network idle signal indicating whether the two-dimensional mesh routers are in an idle state, based on the idle signal from each of the two-dimensional mesh routers, a delay circuit that detects whether an elapse time reaches a waiting time, by counting the elapse time from a time point at which the network idle signal enters the idle state, and a clock generator that generates a neuron clock signal for driving the neuron cores, when the elapse time reaches the waiting time.

11 Claims, 7 Drawing Sheets

(56) References Cited

U.S. PATENT DOCUMENTS

| | | | |
|---|---|---|---|
| 2017/0116513 A1* | 4/2017 | Andreopoulos ....... | G06N 3/063 |
| 2018/0082170 A1 | 3/2018 | Modha | |
| 2018/0174023 A1* | 6/2018 | Imam .................... | G06N 3/063 |
| 2018/0174041 A1* | 6/2018 | Imam .................... | G06N 3/063 |
| 2018/0322384 A1* | 11/2018 | Augustine .............. | G06N 3/049 |
| 2019/0042909 A1* | 2/2019 | Sumbul ................... | G06N 3/08 |
| 2019/0197391 A1* | 6/2019 | Chen ..................... | G06N 3/063 |
| 2020/0143229 A1* | 5/2020 | Van Der Made ...... | G06N 3/049 |

FOREIGN PATENT DOCUMENTS

| | | |
|---|---|---|
| KR | 10-2021-0004344 A | 1/2021 |
| KR | 10-2021-0004347 A | 1/2021 |

* cited by examiner

Packet Format

SPIKING NEURAL NETWORK AND NEURON CLOCK GENERATING METHOD THEREOF

CROSS-REFERENCE TO RELATED APPLICATIONS

This application claims priority under 35 U.S.C. § 119 to Korean Patent Application No. 10-2021-0040307 filed on Mar. 29, 2021, in the Korean Intellectual Property Office, the disclosures of which are incorporated by reference herein in their entireties.

BACKGROUND

Embodiments of the present disclosure described herein relate to a spiking neural network, and more particularly, relate to a spiking neural network guaranteeing the quality of service and a neuron clock generating method thereof.

A spiking neural network that is a computing scheme implemented by mimicking the biological characteristics of the human brain is a technology that is expected to implement the original brain's thinking ability with an ultra-low power. The organism's brain is a network of neurons and synapses connecting the neurons. A synapse may be at the point where the axon of a neuron and the dendrite of another neuron are connected. A neuron receives spike signals from other neurons through the dendrites, multiplies a spike signal and a synapse weight for each of inputs, sums multiplication values associated with the inputs, and generates a spike voltage with a magnitude of about 100 mV and a short duration of 1 to 2 ms when a result of adding a summation result and a membrane potential exceeds a threshold voltage of each neuron. This spike is transferred to hundreds or thousands of next neurons through the axon. In the spiking neural network, each neuron processes information by using spikes fired from each neuron, timings of the spikes, a synaptic connection relationship, and synaptic weights.

In the case of mimicking the biological nerve cell so as to be implemented on silicon, it is very difficult to implement trillions of synaptic connections connecting billions of neurons on a two-dimensional silicon plane while supporting flexibility and scalability. Each neuron is synaptically connected with at least 100 to more than 1000 neurons. The spiking neural network that mimics an actual biological neuromorphic system does not provide a fully connected network between neuronal layers and may provide a connection when a synaptic weight is greater than a given value, depending on the sparsity of synaptic connections.

In the case where this synaptic connection is made by using a separate hardware wire, an excessive chip area is required for wiring, and the flexibility and scalability of the system are greatly reduced. Because the firing rate of a biological neuron of the human is about 100 times per second and is relatively slow compared to an operating speed of a silicon chip, it is efficient to implement it by using a sharable communication network.

In a spiking neural network, because a time when a neuron generates a spike is important information, a synaptic connection communication structure should transfer spikes simultaneously generated from multiple neurons to a destination neuron within a fast time. In addition, because the connection relationship between neurons varies depending on problems to be handled by the spiking neural network, there are required the flexibility and scalability of the communication structure capable of easily reflecting the connection relationship.

In the case of designing a synaptic communication structure with an asynchronous system, because a clock for synchronization of the whole system is not used, it is possible to implement a low power, but there is a difficulty in designing an asynchronous circuit. In addition, when multiple spike information competes for a small number of communication resources on a communication network, spike transfer timings in the learning phase and the inference phase may differ from each other. This may cause an abnormal operation of the system. That is, the accuracy of the learning and inference may be reduced.

In the case of implementing a synaptic communication structure with a synchronous system that is relatively easy to design, when spikes are generated from multiple neurons simultaneously or consecutively, a lot of time is taken to transfer the spikes to a destination in the communication structure. Because a difference between operating speeds of a neuron clock for a time point at which neurons in charge of the learning and inference perform calculation and fire spikes and a network clock for driving a communication network transferring the spikes is significantly great, it is advantageous to design a synaptic communication structure with a dual clock system in which clocks of different speeds (or frequencies) are used. The network clock for synchronization of the communication structure is much faster in speed than the neuron clock for synchronizing operations of neurons (Network Clock>>Neuron Clock).

In the case where the network clock is M times faster than the neuron clock by fixing a relative clock speed between two clocks to a given ratio of "M", the design is simple, but accurate learning and inference are possible only when all the spikes generated by neurons are transferred to destination neurons during a time corresponding "M*Neuron Clock". The number of spikes generated during one cycle of the neuron clock may be variable depending on situations. When the value of "M" is set large enough to correspond to the time when all the spikes are capable of being transmitted assuming the maximum number of spikes, the communication structure becomes dormant in the remaining cases except for the case where a maximum number of spikes are generated, which is very inefficient.

In contrast, when the value of "M" is set to a value smaller than the maximum expected value, the time when the communication structure is in a dormant state is reduced, which is more efficient. However, the probability that the accuracy of the learning and inference decreases due to spikes that fail to be transmitted due to an insufficient time is high. Accordingly, there is a need for a communication structure capable of transferring all the spikes generated every moment to the destination and minimizing power consumption and the time when the communication structure is in a dormant state.

SUMMARY

Embodiments of the present disclosure provide a method for generating a neuron clock at a variable speed, not a fixed speed, after all the fired spikes arrive at a destination. As such, it is possible to accurately perform learning and inference and to minimize a time when the communication structure is in a dormant state, thereby minimizing an operating time and power consumption of a system.

According to an embodiment, a spiking neural network which transfers a spike packet between a plurality of neuron cores includes a plurality of two-dimensional mesh routers that respectively correspond to the plurality of neuron cores and each of which outputs an idle signal based on a state of an input buffer or an output buffer in which the spike packet is stored, a gate circuit that generates a network idle signal indicating whether the plurality of two-dimensional mesh routers are in an idle state, based on the idle signal from each of the plurality of two-dimensional mesh routers, a delay circuit that detects whether an elapse time reaches a waiting time, by counting the elapse time from a time point at which the network idle signal enters the idle state, and a clock generator that generates a neuron clock signal for driving the plurality of neuron cores, when the elapse time reaches the waiting time.

In an embodiment, each of the plurality of two-dimensional mesh routers includes a logic element that generates the idle signal indicating a buffer state of the corresponding two-dimensional mesh router based on an input buffer empty signal indicating whether the input buffer is empty and an output buffer empty signal indicating whether the output buffer is empty.

In an embodiment, the logic element activates the idle signal when the input buffer and the output buffer are empty.

In an embodiment, the gate circuit includes a plurality of first layer AND gates that perform an AND operation on idle signals respectively output from the plurality of two-dimensional mesh routers, and a second layer AND gate that performs an AND operation on outputs of the plurality of first layer AND gates so as to be output as the network idle signal.

In an embodiment, each of the first layer AND gates performs an AND operation on idle signals, which are transferred from four adjacent two-dimensional mesh routers of the plurality of two-dimensional mesh routers.

In an embodiment, the waiting time corresponds to a minimum time for completing spike packet transmission on a synaptic communication network, during the idle state of the plurality of two-dimensional mesh routers.

In an embodiment, the waiting time corresponds to one of a first time taken to store a spike packet generated at a first neuron core of the plurality of neuron cores in an input buffer of a two-dimensional mesh router corresponding to the first neuron core through an arbiter of the first neuron core, and a second time taken to transfer the spike packet from an output buffer of the corresponding two-dimensional mesh router to each of the plurality of neuron cores and add synapse weights to a membrane potential.

In an embodiment, the waiting time is determined based on one having a greater value from among the first time and the second time.

In an embodiment, at least one of the delay circuit and the clock generator is driven by a network clock signal for driving a communication network transferring a spike of the spiking neural network.

According to an embodiment, a method for generating a neuron clock signal for driving a plurality of neuron cores of a spiking neural network transferring a spike packet between the plurality of neuron cores includes receiving a plurality of idle signals from a plurality of two-dimensional mesh routers respectively corresponding to the plurality of neuron cores, checking whether all the idle signals are activated, activating a network idle signal when all the idle signals are activated, detecting whether an elapse time, during which the network idle signal maintains an active state, reaches a waiting time, and generating the neuron clock signal when the elapse time reaches the waiting time.

In an embodiment, the idle signal received from one of the plurality of two-dimensional mesh routers is activated when both an input buffer and an output buffer of the one of the plurality of two-dimensional mesh routers are in empty state.

In an embodiment, the network idle signal is generated by performing an AND operation on the plurality of idle signals.

In an embodiment, the waiting time corresponds to a minimum time for completing spike packet transmission on a synaptic communication network, during an idle state of the plurality of two-dimensional mesh routers.

In an embodiment, the waiting time corresponds to one of a first time taken to store a spike packet generated at a first neuron core of the plurality of neuron cores in an input buffer of a two-dimensional mesh router corresponding to the first neuron core through an arbiter of the first neuron core, and a second time taken to transfer the spike packet from an output buffer of the corresponding two-dimensional mesh router to each of the plurality of neuron cores and add synapse weights to a membrane potential.

In an embodiment, the waiting time is determined based on one having a greater value from among the first time and the second time.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
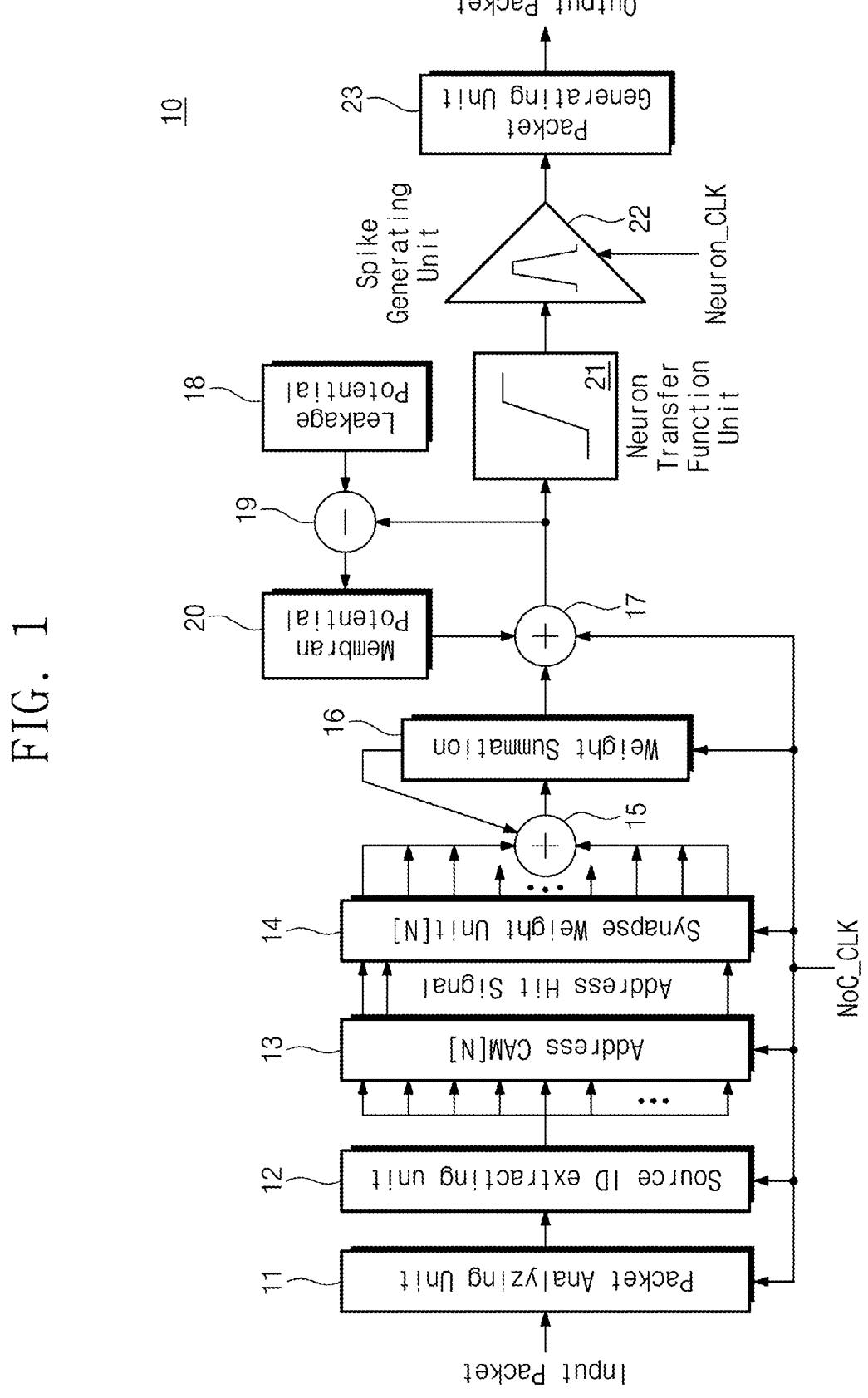
FIG. 1 is a block diagram illustrating a structure of a neuron constituting a spiking neural network.

Below, some embodiments of the present disclosure will be described in detail with reference to the accompanying drawings. In adding reference numerals to components of each drawing, the same components may have the same reference numerals as much as possible even though they are indicated in different drawings. In addition, in describing the present disclosure, in the case where it is determined that the detailed description of a related known configuration or function may obscure the essential points of the present disclosure, the detailed description may be omitted.

In addition, in describing components of the present disclosure, the terms such as first, second, A, B, (a), and (b) may be used. These terms are only used to distinguish one element from another element, but the essence, order, or number of the corresponding component is not limited by the terms. When it is described that a first component is "connected" or "coupled" to a second component, the first component may be directly connected or coupled to the second component, but it may be understood that any other component(s) may be interposed therebetween or the first component may be "connected" or "coupled" to the second component through any other component(s).

FIG. 1 is a block diagram illustrating a structure of a neuron constituting a spiking neural network. Referring to FIG. 1, a neuron 10 may include a packet analyzing unit 11, a source ID extracting unit 12, an address CAM 13, a synapse weight unit 14, adders 15 and 17, a leakage potential 18, a subtracter 19, a membrane potential 20, a neuron transfer function unit 21, a spike generating unit 22, and a packet generating unit 23.

An input packet that is a spike packet generated from another neuron is input to the neuron 10 through a communication network of the spiking neural network. The packet analyzing unit 11 analyzes the input packet. Addresses or source IDs of other neurons, each of which transmits the input packet, may be extracted by the packet analyzing unit 11. The source ID extracting unit 12 analyzes and extracts a ID (hereinafter referred to as a "source ID") of a source neuron transmitting a spike from the received input packet and finds a synapse weight set to a connection with a source neuron from the address CAM (Content Addressable Memory) 13 by using the source ID. The extracted source ID is simultaneously compared with all input addresses stored in the address CAM 13; when a matched address exists (i.e., when a hit signal occurs at a corresponding index), a synapse weight corresponding to the matched index of the address CAM 13 is extracted by the synapse weight unit 14, and the extracted synapse weight is transferred to the adder 15 so as to be sequentially added to an existing weight sum. The synapse weight set to a connection with a source neuron is found from the address CAM 13 by using it. The extracted synapse weight is stored in the synapse weight unit 14. The extraction of the synapse weight is performed on all input packets input to the neuron 10 by using a network clock NoC_CLK. When a result that is obtained by adding a sum of synapse weights of neurons and a present value of the membrane potential 20 exceeds a threshold value of each neuron defined by the neuron transfer function unit 21, an output spike signal is generated by the spike generating unit 22. The output spike signal may be generated in the form of a packet by the packet generating unit 23 and may be provided as an output packet. The output packet may be transmitted to hundreds or thousands of other neurons through a synaptic communication network.

In the above neuron structure, a neuron clock Neuron_CLK may be concerned in only an operation of generating the output spike signal at the spike generating unit 22. The network clock NoC_CLK is used in most neuron operations including an operation of extracting a source ID from an input packet, obtaining a synapse weight, or obtaining a sum of weights.

Figure 2:
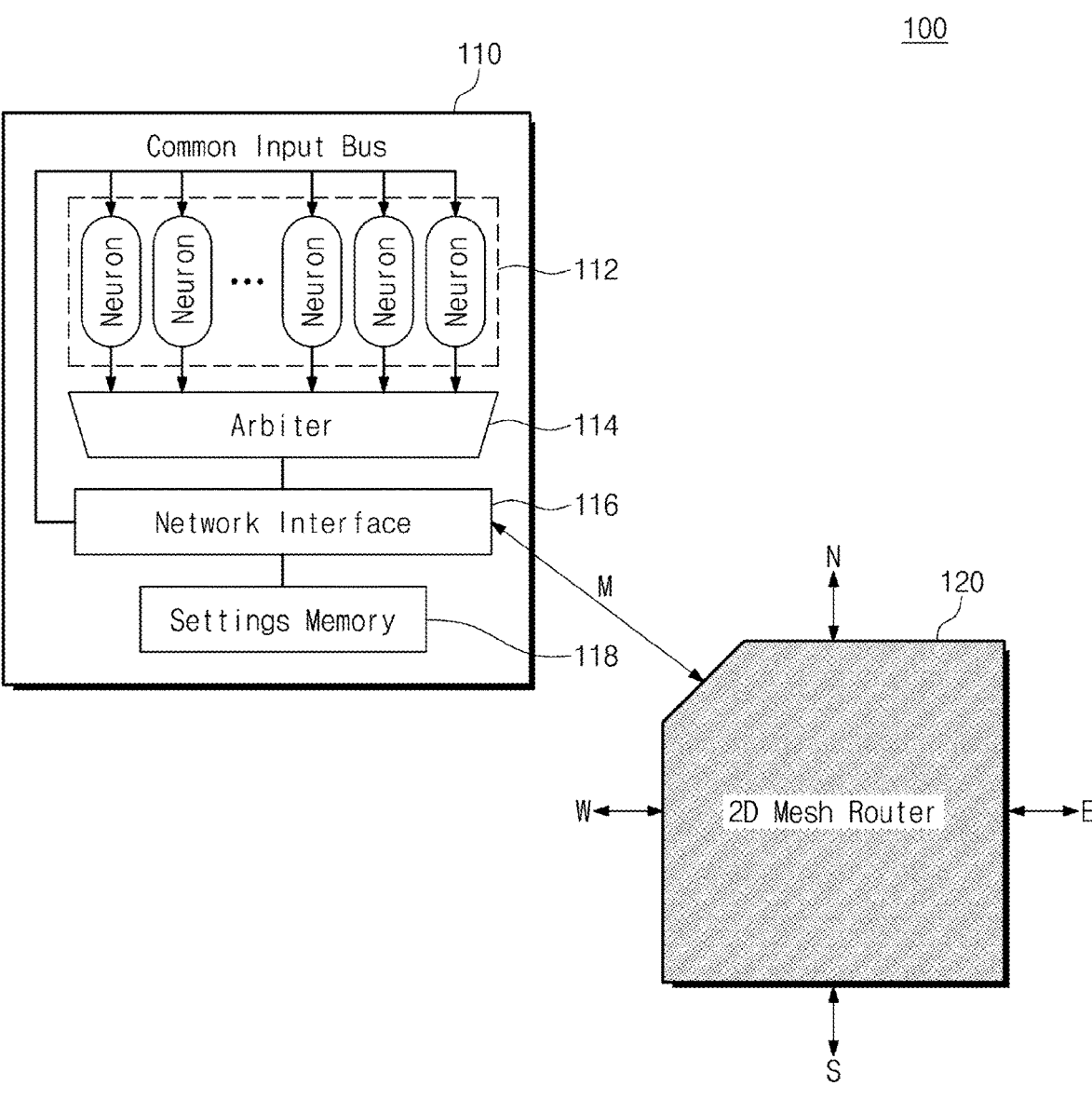
FIG. 2 is a block diagram illustrating a configuration of a neuron core, which neurons of FIG. 1 constitute, and a two-dimensional mesh router.

FIG. 2 is a block diagram illustrating a configuration of a neuron core, which neurons of FIG. 1 constitute, and a two-dimensional mesh router. Referring to FIG. 2, a basic unit of a synaptic communication network may be composed of a neuron core 110 and a two-dimensional mesh router 120.

The neuron core 110 may include a neuron array 112 including a plurality of neurons having (or performing) the structure (or function) described with reference to FIG. 1, an arbiter 114, a network interface 116, and a settings memory 118. The neuron array 112 may include N neurons (e.g., N being a natural number of 100 or more) connected in structure between a common input bus and the arbiter 114. That is, a spike packet received from the two-dimensional mesh router 120 is transferred to the neuron core 110 by using the network interface 116. The network interface 116 transfers the received spike packet to all neurons in the neuron array 112 through the common input bus.

Output spike packets respectively generated by the neurons in the neuron array 112 may be selected by the arbiter 114 so as to be sequentially transferred to the network interface 116. The arbiter 114 selects the output spike packets sequentially depending on the order of occurrence of the output spike packets so as to be transferred to the network interface 116. The output spike packets transferred to the network interface 116 are transferred to a destination neuron core and a neuron through the two-dimensional mesh router 120.

The settings memory 118 in the neuron core 110 stores information of destination neurons necessary for routing on a network-on-chip (NoC) and information necessary to set a source ID and a synapse weight of each table item of a CAM of each neuron. When one spike is generated by a neuron, packets are required as much as the total number of destination neurons; however, considering the structure of the neuron core 110, packet broadcasting may again be performed at a destination core, and thus, only one packet may be transmitted for each destination core, in substance.

The two-dimensional mesh router 120 exchanges spike packets through a plurality of channels E, W, S, N, and M. The two-dimensional mesh router 120 communicates with another adjacent two-dimensional mesh router constituting a synaptic communication network through the channels E, W, S, and N. The two-dimensional mesh router 120 communicates with the neuron core 110 corresponding to a node, which the two-dimensional mesh router 120 takes full charge of, through the channel M. The two-dimensional mesh router 120 may transmit a packet input in a crossbar switch manner to a destination.

Figure 3:
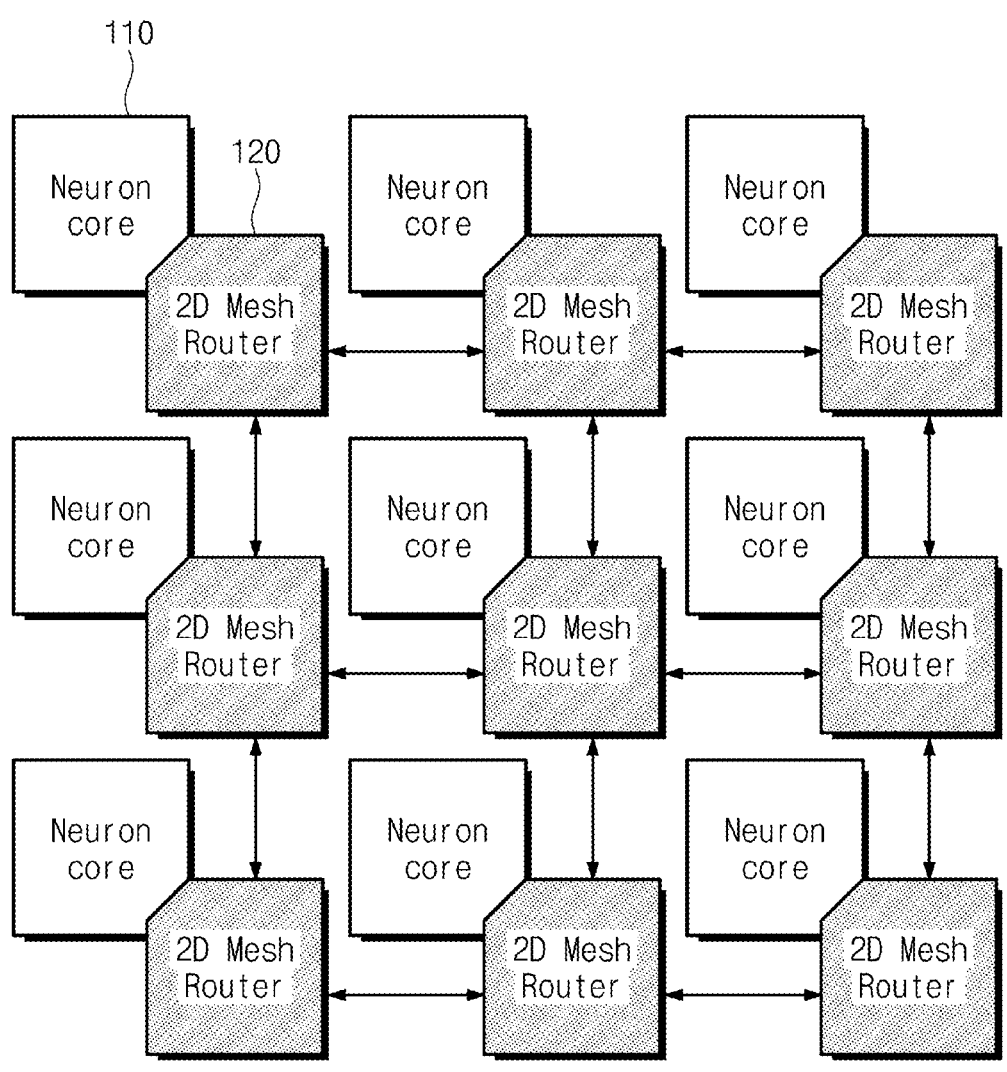
FIG. 3 is a block diagram illustrating a synaptic communication network according to an embodiment of the present disclosure.

FIG. 3 is a block diagram illustrating a synaptic communication network according to an embodiment of the present disclosure. Referring to FIG. 3, a plurality of neuron cores and a plurality of two-dimensional mesh routers constitute a hierarchical synaptic communication network.

The synaptic communication network should transfer spikes generated from the plurality of neuron cores at the same time to descriptions within a fast time. A large bandwidth is required to transfer spike packets on the synaptic communication network. Accordingly, the synaptic communication network uses a network-on-chip of a two-dimensional mesh topology, which provides a high communication bandwidth and excellent scalability, as a communication structure. Each of neuron cores may be connected with one two-dimensional mesh router, and each of two-dimensional mesh routers may be connected with peripheral routers adjacent thereto in the shape of a lattice.

Figure 4:
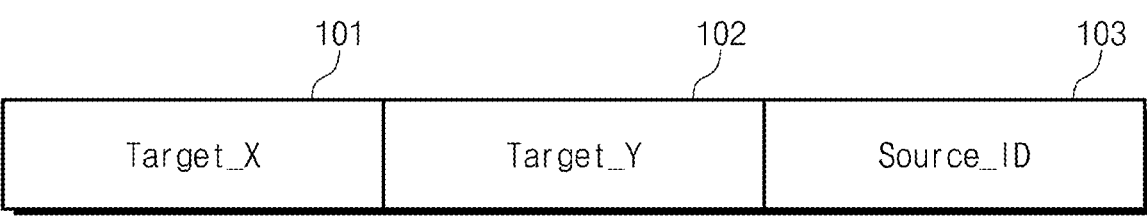
FIG. 4 is a diagram illustrating a spike packet for transmission of a spike according to the present disclosure.

FIG. 4 is a diagram illustrating a spike packet for transmission of a spike according to the present disclosure. Referring to FIG. 4, a spike packet may include coordinates (Target_X, Target_Y) of a destination neuron core and a source ID (Source_ID) field.

In the spiking neural network, information processing is performed by using a timing, a synaptic connection relationship, and a synapse weight of a spike. Information that the synaptic communication network intends to transfer may include a timing of a spike and an identifier ID of a neuron at which the spike is generated.

The timing of the spike is generally replaced with a time when a spike arrives at a destination neuron. Accordingly, information to be included in a spike packet for spike transmission may be composed of coordinates (Target_X, Target_Y) of a destination neuron core and a source ID Source_ID of a neuron at which a spike is generated. The coordinates (Target_X, Target_Y) of the neuron core may correspond to a location or address of a destination neuron core, which is defined by a row and a column on the spike communication network.

Figure 5:
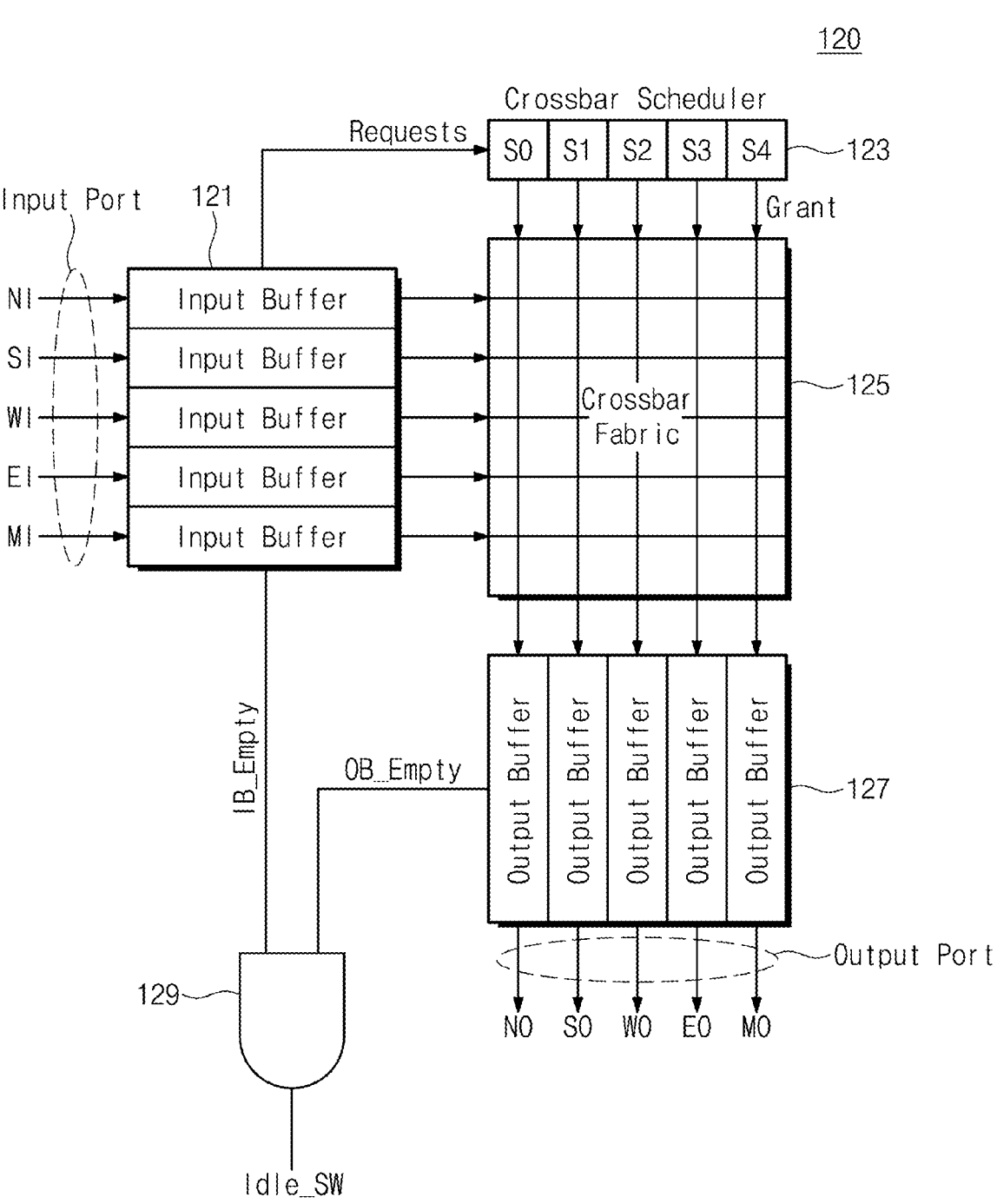
FIG. 5 is a block diagram illustrating a structure of a two-dimensional mesh router according to the present disclosure.

FIG. 5 is a block diagram illustrating a structure of a two-dimensional mesh router according to the present disclosure. Referring to FIG. 5, the two-dimensional mesh router 120 may include an input buffer 121, a crossbar scheduler 123, a crossbar fabric 125, an output buffer 127, and a buffer state output unit 129.

The input buffer 121 stores input packets NI, SI, WI, EI, and MI input to an input port through the channels E, W, S, N, and M. The input buffer 121 transfers requests to the crossbar scheduler 123 depending on destination coordinates included in the received input packets NI, SI, WI, EI, and MI.

The crossbar scheduler 123 may output a grant signal to the crossbar fabric 125 in response to the request provided from the input buffer 121. The crossbar scheduler 123 transfers, to the output buffer 127, the grant signal permitting whether to output the input packets NI, SI, WI, EI, and MI stored in the input buffer 121 depending on the request. The input packets NI, SI, WI, EI, and MI corresponding to the grant signal may be transferred to the output buffer 127 and may then be output as output packets through an output port.

The crossbar scheduler 123 may be implemented by various scheduling algorithms depending on applications. For example, the crossbar scheduler 123 may use a round-robin algorithm that generally regards the fairness as the highest priority. Alternatively, the crossbar scheduler 123 may use a FixedPriority algorithm complying with a given priority.

The crossbar fabric 125 may transfer input packets input to the input buffers 121 to output terminals depending on a routing policy. Input/output switching is not illustrated, but may be scheduled through a crossbar scheduler (not illustrated).

When all buffers respectively storing the input packets NI, SI, WI, EI, and MI are empty, the input buffer 121 generates an input buffer empty signal IB_Empty. When all buffers respectively storing output packets NO, SO, WO, EO, and MO are empty, the output buffer 127 generates an output buffer empty signal OB_Empty. When the input packets NI, SI, WI, EI, and MI are absent from the input buffer 121, the input buffer 121 may output the input buffer empty signal IB_Empty of logic "1". When at least one of the input packets NI, SI, WI, EI, and MI is present in the input buffer 121, the input buffer 121 may output the input buffer empty signal IB_Empty of logic "0". When the output packets NO, SO, WO, EO, and MO are absent from the output buffer 127, the output buffer 127 may output the output buffer empty signal OB_Empty of logic "1". Like the input buffer 121, when at least one of the output packets NO, SO, WO, EO, and MO is present in the output buffer 127, the output buffer 127 may output the output buffer empty signal OB_Empty of logic "0".

The buffer state output unit 129 generates an idle signal Idle_SW indicating an idle state of the two-dimensional mesh router 120. The buffer state output unit 129 may output the idle signal Idle_SW of the two-dimensional mesh router 120 based on the input buffer empty signal IB_Empty from the input buffer 121 and the output buffer empty signal OB_Empty from the output buffer 127. For example, the buffer state output unit 129 may be implemented with a gate (hereinafter referred to as a "AND gate") performing an AND operation on the input buffer empty signal IB_Empty and the output buffer empty signal OB_Empty. In this case, when both the input buffer empty signal IB_Empty and the output buffer empty signal OB_Empty are logic "1", the idle signal Idle_SW of logic "1" may be output. That is, when both the input buffer 121 and the output buffer 127 are in a fully empty state, the buffer state output unit 129 may generate the idle signal Idle_SW of logic "1".

Figure 6:
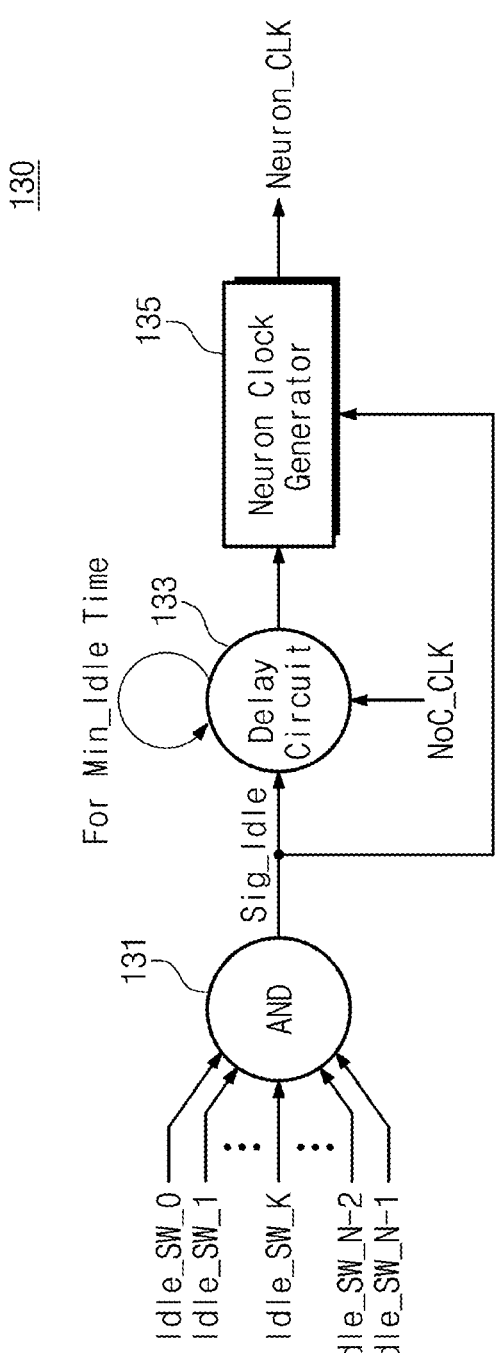
FIG. 6 is a block diagram illustrating a neuron clock generator according to an embodiment of the present disclosure.

FIG. 6 is a block diagram illustrating a neuron clock generator according to an embodiment of the present disclosure. Referring to FIG. 6, a neuron clock generator 130 of the present disclosure includes an AND gate 131, a delay circuit 133, and a neuron clock generator 135.

The AND gate 131 receives a plurality of idle signals Idle SW_0 to Idle_SW_N–1 respectively provided from two-dimensional mesh routers included in the synaptic communication network. That is, the AND gate 131 may monitor whether the two-dimensional mesh routers are in a state where all spike packets are completely transmitted or are in a state where spike packets are being transmitted. As described with reference to FIG. 5, a value of each of the plurality of idle signals Idle_SW_0 to Idle_SW_N–1 is determined depending on states of an input buffer and an output buffer of each of the two-dimensional mesh routers. When all the idle signals Idle_SW_0 to Idle_SW_N–1 are logic "1", the AND gate 131 may activate a network idle signal Sig Idle to logic "1". When at least one of the idle signals Idle_SW_0 to Idle_SW_N–1 is logic "0", the AND gate 131 may deactivate the network idle signal Sig_Idle to logic "0". The network idle signal Sig_Idle is simultaneously transferred to the delay circuit 133 and the neuron clock generator 135.

The delay circuit 133 delays a time point at which the network idle signal Sig_Idle is activated (i.e., transitions to "1"), during a waiting time Min_Idle Time. That is, the delay circuit 133 may notify the neuron clock generator 135 whether the network idle signal Sig_Idle maintains logic "1" during the waiting time Min_Idle Time from the time point at which the network idle signal Sig_Idle is activated (i.e., transitions to "1"). A count during the waiting time Min_Idle Time of the delay circuit 133 is driven based on the network clock NoC_CLK.

The waiting time Min_Idle Time may correspond to a value to which a first time that is necessary to store a spike packet generated at each neuron core in an input buffer (e.g., 121 of FIG. 5) through an arbiter of the corresponding neuron core is applied. Alternatively, the waiting time Min_Idle Time may correspond to a value to which a second time that is necessary to transfer a spike packet to each neuron through a bus from an output buffer (e.g., 127 of FIG. 5), to analyze the spike packet, and to add a synapse weight to a membrane potential value is applied. The waiting time Min_Idle Time that is a constant to which one being substantially larger from among the first time and the second time is applied may be a minimum time for waiting to prepare for the case where all the two-dimensional mesh routers are temporarily in a dormant state but a spike packet to be transmitted (or pending) exists.

Whether the waiting time Min_Idle Time elapses is counted from a time point at which the idle signals Idle_SW_0 to Idle_SW_N–1 of all the two-dimensional mesh routers in the synaptic communication network are "1", that is, the network idle signal Sig_Idle is set to (or transitions to) logic "1". In the case where the network idle signal Sig_Idle maintains "1" even after the waiting time Min_Idle Time elapses, the neuron clock generator 135 outputs the neuron clock Neuron_CLK. In this case, the neuron clock generator 135 is also driven by the network clock NoC_CLK that is used to drive the synaptic communication network. Accordingly, because neurons operate based on the neuron clock Neuron_CLK generated after all spike packets in the synaptic communication network are transmitted, spike packets are exchanged without loss, and thus, it is possible to guarantee the quality of service (QoS).

Figure 7:
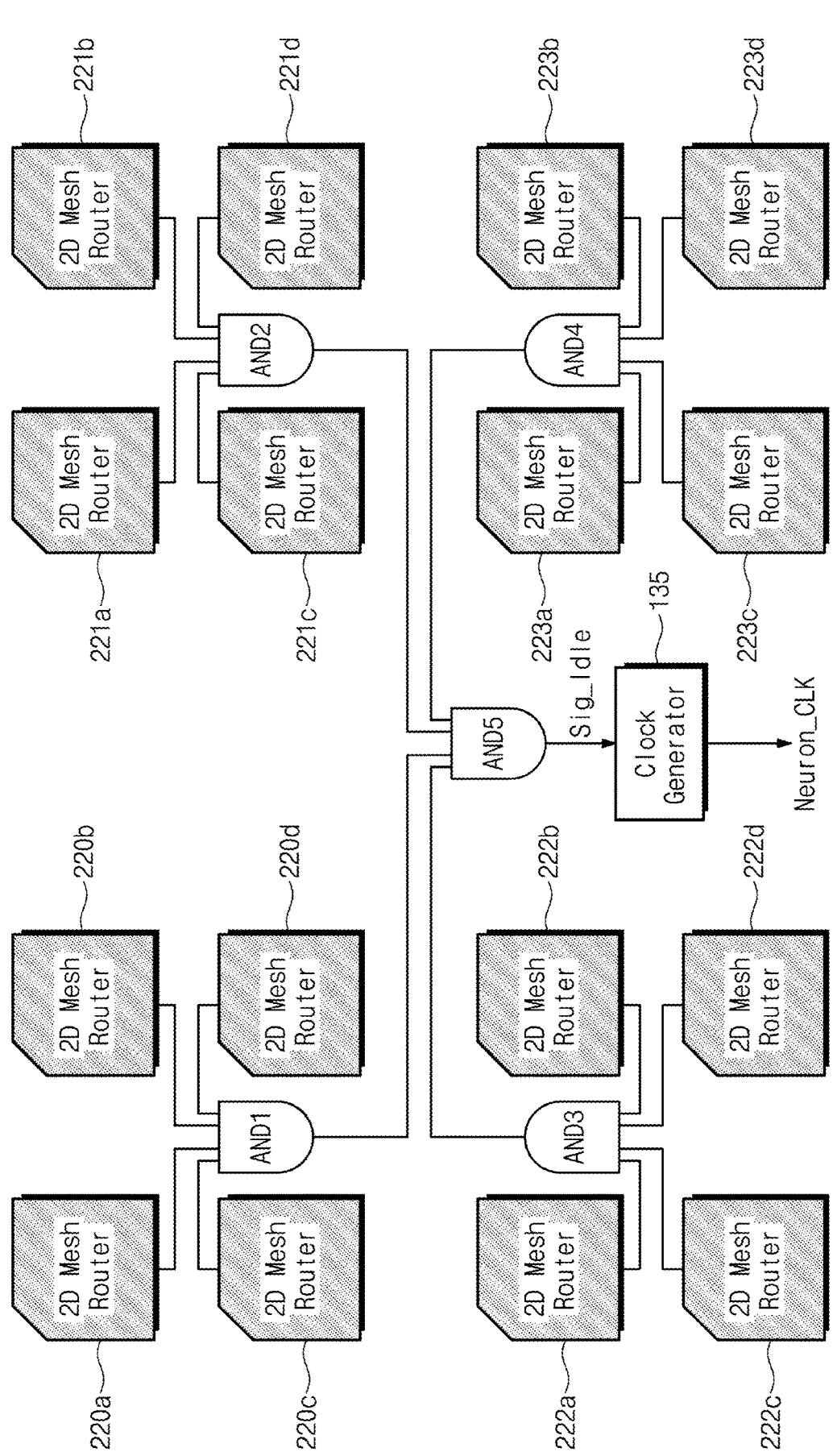
FIG. 7 is a block diagram illustrating an example of an idle signal network in a synaptic communication network.

FIG. 7 is a block diagram illustrating an example of an idle signal network in a synaptic communication network. Referring to FIG. 7, two-dimensional mesh routers 220a to 223d, AND gates AND1 to AND5, and the neuron clock generator 135 are schematically illustrated to describe the idle signal network. Neuron cores that are respectively connected with the two-dimensional mesh routers 220a to 223d are not illustrated.

Idle signals Idle_SW that the two-dimensional mesh routers 220a to 223d in the synaptic communication network output, for example, that are generated by all router switches thereof are collected by the AND gates AND1 to AND5. As such, the network idle signal Sig_Idle may be generated by the AND gate AND5. The AND gates AND1 to AND5 are used to collect the idle signals Idle_SW that the two-dimensional mesh routers 220a to 223d generate.

According to a configuration of the synaptic communication network considering a delay of a signal line and a fanout, the idle signals Idle_SW may be collected in units of 4 adjacent two-dimensional mesh routers 220a to 220d, 221a to 221d, 222a to 222d, and 223a to 223d. For example, the idle signals Idle_SW that are provided from the 4 (2×2) two-dimensional mesh routers 220a to 220d adjacent to each other are collected by the AND gate AND1. The idle signals Idle_SW that are provided from the 4 (2×2) two-dimensional mesh routers 221a to 221d adjacent to each other are collected by the AND gate AND2. The idle signals Idle_SW that are provided from the 4 (2×2) two-dimensional mesh routers 222a to 222d adjacent to each other are collected by the AND gate AND3. The idle signals Idle_SW that are provided from the 4 (2×2) two-dimensional mesh routers 223a to 223d adjacent to each other are collected by the AND gate AND4. Outputs of the AND gates AND1, AND2, AND3, and AND4 may be collected by the AND gate AND5 of an upper layer such that the network idle signal Sig_Idle is generated.

The structure of the idle signal network is above described as a quad tree network in which the idle signals Idle_SW are provided from a mesh router group including four mesh routers in the structure of the 16 (4×4) two-dimensional mesh routers 220a to 223d. The quad tree network structure is most suitable for the shape of a two-dimensional mesh structure and is known to have the greatest ease of layout. Finally, the output of the AND gate AND5 of the uppermost level is provided to the neuron clock generator 135 as the network idle signal Sig_Idle.

However, this topology is only an example of an idle signal network, and the present disclosure is not limited to the idle signal network topology described above. It will be well understood that topologies for generating the network idle signal Sig Idle may be proposed in various ways depending on the number of two-dimensional mesh routers. In addition, an AND gate is illustrated as a logic gate that collects the idle signals Idle_SW output from two-dimensional mesh routers, but, if necessary, the idle signals Idle_SW may be collected by using a NAND gate or various logic devices.

Figure 8:
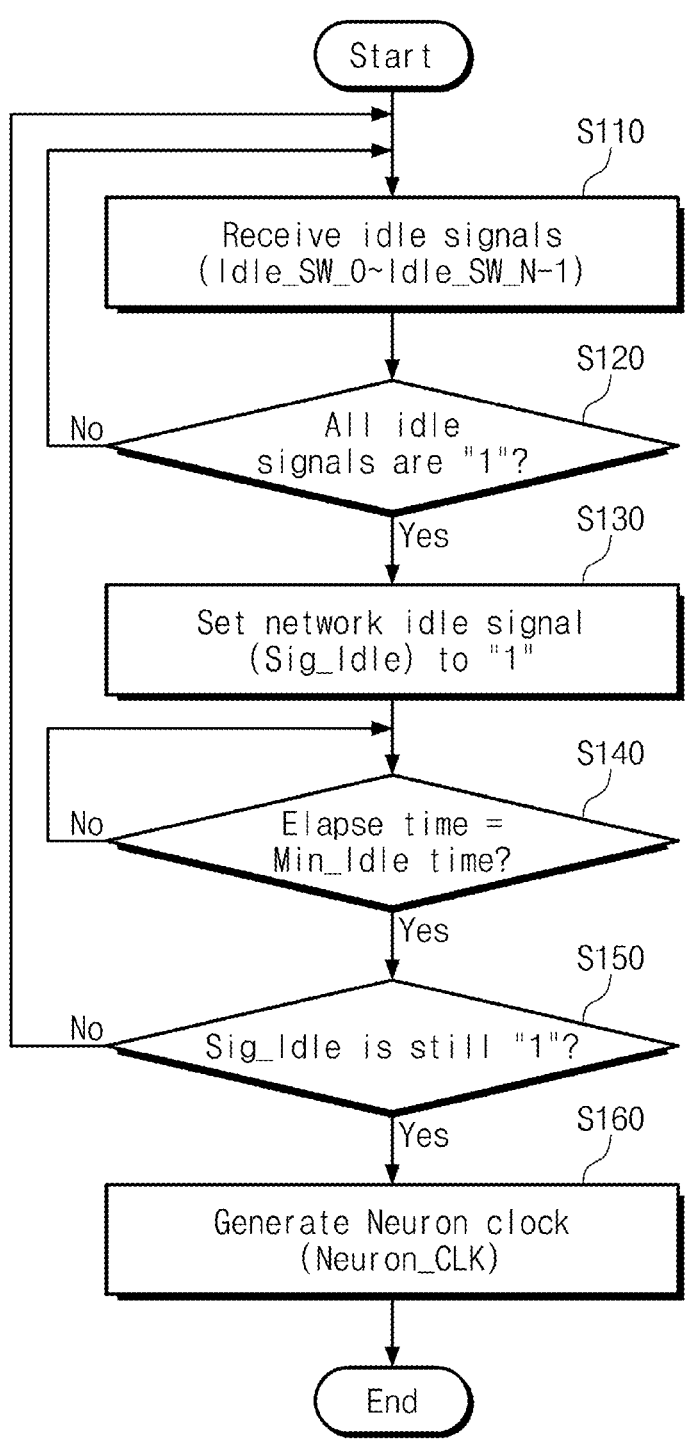
FIG. 8 is a flowchart illustrating a method in which a neuron clock generator of FIG. 6 generates a neuron clock.

FIG. 8 is a flowchart illustrating a method in which a neuron clock generator of FIG. 6 generates the neuron clock Neuron_CLK. Referring to FIGS. 6 to 8, the neuron clock generator 130 generate the neuron clock Neuron_CLK based on the idle signals Idle_SW_0 to Idle_SW_N−1 transferred from two-dimensional mesh routers through the idle signal network.

In operation S110, the neuron clock generator 130 may collect the idle signals Idle_SW_0 to Idle_SW_N−1 transferred from two-dimensional mesh routers through the idle signal network as illustrated in FIG. 7. For example, the idle signals Idle_SW_0 to Idle_SW_N−1 may be provided from AND gates that are implemented in a multi-layer structure.

In operation S120, the neuron clock generator 130 detects whether all the idle signals Idle_SW_0 to Idle_SW_N−1 are logic "1". That is, the neuron clock generator 130 may check whether input and output buffers of all the two-dimensional mesh routers are empty, through the idle signals Idle_SW_0 to Idle_SW_N−1. When all the idle signals Idle_SW_0 to Idle_SW_N−1 are not logic "1" (No), the procedure proceeds to operation S110 to again collect states of all the idle signals Idle_SW_0 to Idle_SW_N−1. In contrast, when it is detected that all the idle signals Idle_SW_0 to Idle_SW_N−1 are logic "1" (Yes), the procedure proceeds to operation S130.

In operation S130, the neuron clock generator 130 may set the network idle signal Sig_Idle to a set state (i.e., logic "1") so as to indicate that all the two-dimensional mesh routers are in an idle state. The transition to the set state may be performed by the AND gate AND5 placed at the uppermost level of the idle signal network topology of FIG. 7.

In operation S140, the neuron clock generator 130 counts an elapse time from a time point at which the network idle signal Sig_Idle transitions to "1". For example, whether the elapse time passes as much as the waiting time Min_Idle Time from the time point at which the network idle signal Sig_Idle transitions to "1" may be checked by the delay circuit 133 of FIG. 6. When the elapse time reaches the waiting time Min_Idle Time (Yes), the procedure proceeds to operation S150. When the elapse time does not reach the waiting time Min_Idle Time (No), the neuron clock generator 130 may continue to count.

In operation S150, there is checked whether the network idle signal Sig_Idle maintains a "1" state even after the elapse time reaches the waiting time Min_Idle Time. When the network idle signal Sig_Idle still maintains the "1" state, the procedure proceeds to operation S160. In contrast, the network idle signal Sig_Idle may transition to "0" after the elapse time reaches the waiting time Min_Idle Time (No). In this case, the procedure proceeds to operation S110 to again start monitoring all the idle signals Idle_SW_0 to Idle_SW_N−1.

In operation S160, the neuron clock generator 130 generates the neuron clock Neuron_CLK based on the network clock NoC_CLK.

The method in which the neuron clock generator 130 generates the neuron clock Neuron_CLK based on the idle signals Idle_SW_0 to Idle_SW_N−1 and the network clock NoC_CLK is described above. In an actual system, the network clock NoC_CLK is a clock signal of a fixed frequency (e.g., 10 MHz). However, according to the a neuron clock (Neuron_CLK) generating scheme of the present disclosure, the neuron clock Neuron_CLK may be generated with a variable period depending on the traffic of the synaptic communication network. It has been confirmed that all spike packets may be transferred to a destination neuron without loss by using the neuron clock Neuron_CLK generated with a variable period.

A spiking neural network according to an embodiment of the present disclosure may transfer spikes generated at the same time within a fast time without loss. Accordingly, in the case where the spiking neural network of the present disclosure is applied, there may be provided a communication structure of very flexible and high scalability, which may improve the accuracy of an artificial intelligence chip and may reduce an execution time and power consumption.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A spiking neural network which transfers a spike packet between a plurality of neuron cores, comprising:
a plurality of two-dimensional mesh routers respectively corresponding to the plurality of neuron cores and each configured to output an idle signal based on a state of an input buffer configured to store spike packets and on a state of an output buffer configured to store spike packets;
a gate circuit configured to generate a network idle signal indicating whether all of the plurality of two-dimensional mesh routers are in an idle state, based on the idle signal from each of the plurality of two-dimensional mesh routers;
a delay circuit configured to detect whether an elapse time reaches a waiting time, by counting the elapse time from a time point at which the network idle signal enters the idle state; and
a clock generator configured to generate a neuron clock signal for driving the plurality of neuron cores, when the elapse time reaches the waiting time and the network idle signal is still in the idle state,
wherein the waiting time corresponds to a minimum time for completing spike packet transmission on a synaptic communication network, during the idle state of the plurality of two-dimensional mesh routers, and
wherein the waiting time corresponds to one of:
a first time taken to store a spike packet generated at a first neuron core of the plurality of neuron cores in an input buffer of a two-dimensional mesh router corresponding to the first neuron core through an arbiter of the first neuron core; and
a second time taken to transfer the spike packet from an output buffer of the corresponding two-dimensional mesh router to each of the plurality of neuron cores and add synapse weights to a membrane potential.

2. The spiking neural network of claim 1, wherein each of the plurality of two-dimensional mesh routers includes:
a logic element configured to generate the idle signal indicating a buffer state of the corresponding two-dimensional mesh router based on an input buffer empty signal indicating whether the input buffer is empty and an output buffer empty signal indicating whether the output buffer is empty.

3. The spiking neural network of claim 2, wherein the logic element activate the idle signal when the input buffer and the output buffer are empty.

4. The spiking neural network of claim 1, wherein the gate circuit includes:
a plurality of first layer AND gates configured to perform an AND operation on idle signals respectively output from the plurality of two-dimensional mesh routers; and
a second layer AND gate configured to perform an AND operation on outputs of the plurality of first layer AND gates so as to be output as the network idle signal.

5. The spiking neural network of claim 4, wherein each of the first layer AND gates performs an AND operation on idle signals, which are transferred from four adjacent two-dimensional mesh routers of the plurality of two-dimensional mesh routers.

6. The spiking neural network of claim 1, wherein the waiting time is determined based on one having a greater value from among the first time and the second time.

7. The spiking neural network of claim 1, wherein at least one of the delay circuit and the clock generator is driven by a network clock signal for driving a communication network transferring a spike of the spiking neural network.

8. A method for generating a neuron clock signal for driving a plurality of neuron cores of a spiking neural network transferring a spike packet between the plurality of neuron cores, the method comprising:
receiving a plurality of idle signals from a plurality of two-dimensional mesh routers respectively corresponding to the plurality of neuron cores;
checking whether all the idle signals are activated;
activating a network idle signal when all the idle signals are activated;
detecting whether an elapse time, during which the network idle signal maintains an active state, reaches a waiting time; and
generating the neuron clock signal when the elapse time reaches the waiting time and the network idle signal is still in the active state,
wherein the waiting time corresponds to a minimum time for completing spike packet transmission on a synaptic communication network, during an idle state of the plurality of two-dimensional mesh routers, and
wherein the waiting time corresponds to one of:
a first time taken to store a spike packet generated at a first neuron core of the plurality of neuron cores in an input buffer of a two-dimensional mesh router corresponding to the first neuron core through an arbiter of the first neuron core; and
a second time taken to transfer the spike packet from an output buffer of the corresponding two-dimensional mesh router to each of the plurality of neuron cores and add synapse weights to a membrane potential.

9. The method of claim 8, wherein the idle signal received from one of the plurality of two-dimensional mesh routers is activated when both an input buffer and an output buffer of the one of the plurality of two-dimensional mesh routers are in empty state.

10. The method of claim 8, wherein the network idle signal is generated by performing an AND operation on the plurality of idle signals.

11. The method of claim 8, wherein the waiting time is determined based on one having a greater value from among the first time and the second time.

* * * * *